United States Patent [19]

Conseur

[11] Patent Number: 4,584,901
[45] Date of Patent: Apr. 29, 1986

[54] TORSIONAL VIBRATION BALANCER

[75] Inventor: Joachim Conseur, Berlin, Fed. Rep. of Germany

[73] Assignee: Carl Hasse & Wrede GmbH, Berlin, Fed. Rep. of Germany

[21] Appl. No.: 499,105

[22] Filed: May 27, 1983

[30] Foreign Application Priority Data

Jun. 11, 1982 [DE] Fed. Rep. of Germany ....... 3221987

[51] Int. Cl.$^4$ .............................................. F16F 15/10
[52] U.S. Cl. ................................................... 74/574
[58] Field of Search ............. 74/574; 192/58 B, 70.17, 192/106.1; 188/378, 380, 371

[56] References Cited

U.S. PATENT DOCUMENTS

| | | | |
|---|---|---|---|
| 2,535,958 | 12/1950 | Sarazin | 74/574 |
| 2,659,244 | 11/1953 | Guy | 74/574 |
| 2,898,777 | 11/1959 | Boehm | 74/574 |
| 3,823,619 | 7/1974 | Shotwell | 74/574 |
| 4,172,510 | 10/1979 | Forkel | 74/574 X |
| 4,422,347 | 12/1983 | Conseur | 74/574 |

FOREIGN PATENT DOCUMENTS

| | | | |
|---|---|---|---|
| 458602 | 8/1949 | Canada | 74/574 |
| 159653 | 5/1940 | Fed. Rep. of Germany | 74/574 |
| 2361956 | 6/1975 | Fed. Rep. of Germany | 74/574 |
| 1017688 | 12/1952 | France | 192/106.1 |

Primary Examiner—Kenneth J. Dorner
Assistant Examiner—Rodney M. Lindsey
Attorney, Agent, or Firm—Pollock, Vande Sande & Priddy

[57] ABSTRACT

A torsional vibration balancer, especially for piston type apparatus having a secondary side seismic mass radially outside a primary member connected to a shaft to be damped. Damping boxes for the resilient and damped coupling of the seismic mass are attached, as replaceable components, to one of the secondary structural elements, preferably to a support disc for the seismic mass. At the interior of the damping boxes there is at least one fitted bolt or similar element, which extends under seal out of the damping box and is fixed to the primary member. This fitted bolt carries shear sheets which are plane parallel and perpendicular to the axis of rotation, and between which stationary metal sheets extend within and are connected to the damping boxes. The spaces between the shear sheets and the metal sheets are filled with silicon oil which is subject to alternate sheaving during relative movements of the sheets. The damping boxes are preferably located, at an angular distance from one another, between springs for guiding the primary and secondary members of the device.

6 Claims, 5 Drawing Figures

TORSIONAL VIBRATION BALANCER

SUMMARY OF THE INVENTION

The present invention relates to a torsional vibration balancer, especially for piston type apparatus.

BACKGROUND OF THE INVENTION

Torsional vibration balancers with a viscous damping medium and external seismic mass are known, e.g., from German Pat. No 1,297,410. In these devices, the inner primary element is surrounded by the annular seismic mass, the primary element being connected to the shaft to be damped, e.g., the crankshaft of an internal combustion engine. For devices of such construction, two annular seals for retaining the damping medium in the working chambers must be provided between the primary element and the external seismic mass. The seals employed for this purpose in prior art dampers, due to the very frequent small sliding movements, are subject to unavoidable wear, so that they do not reliably seal off the creeping damping medium, silicon oil.

In the device according to German Pat. No. 1,074,333, prevulcanized or glued on seal rings are used, while German Pat. No. 1,132,387 discloses the use of pressed in elastomer bands for sealing purposes. Such seals have a negative effect on the damper because of their significant restoring moments and the material damping, so that the performance limits of the device are often determined to a greater extent by the resistance to sliding of the seals than by the capacitance of the damping medium.

Moreover, such seals, especially in the case of larger damper diameters, are very difficult to produce and to join.

A further disadvantage of torsional vibration balancers with external seismic mass arises from the fact that the required surface of the working aperture in which the damping medium is alternatingly sheared can be prepared only with great effort. For example, in the device disclosed in German Published Application No. 23 61 956, several discs are arranged in the median plane of the damper for the purpose of enlarging its fluid-moistened surface. Since the primary side mass moment of intertia is to remain small, such discs must be stamped from thin, large area sheets. The required stamping apparatus for large dampers is uneconomical, and in their installed condition the metal rounds tend to distort in such a manner that a constant aperture width cannot be assured.

OBJECT OF THE INVENTION

It is thus an object of the invention to provide a torsional vibration balancer of the type described which overcomes the disadvantages of prior art devices, by use of components which are simple to construct and to install, and which is capable of optimal damping over a wide range of vibrations, without the previously existing problems of insufficient sealing.

This is accomplished by use of simple sheet metal stampings in groups of so-called damping boxes, which can be assembled separately as modular units to be incorporated in the complete device. The number of shear sheets in the damping boxes can be fine-tuned either according to theoretical calculation or by trial and error. Thus, the coupling of the seismic mass relative to vibration can be changed without consideration of its structural format.

The easily accessible mounting position of the supplemental mass contributing to the total seismic mass is also advantageous, since alteration of the supplemental mass makes it possible to adapt the vibration balancer easily to a wide range of applications.

BRIEF INTRODUCTION TO THE DRAWINGS

In order that the invention may be more clearly understood, reference will now be made to the accompanying drawings, in which an embodiment of the invention is shown for purposes of illustration, and in which.

DESCRIPTION OF A PREFERRED EMBODIMENT

Figure 1:
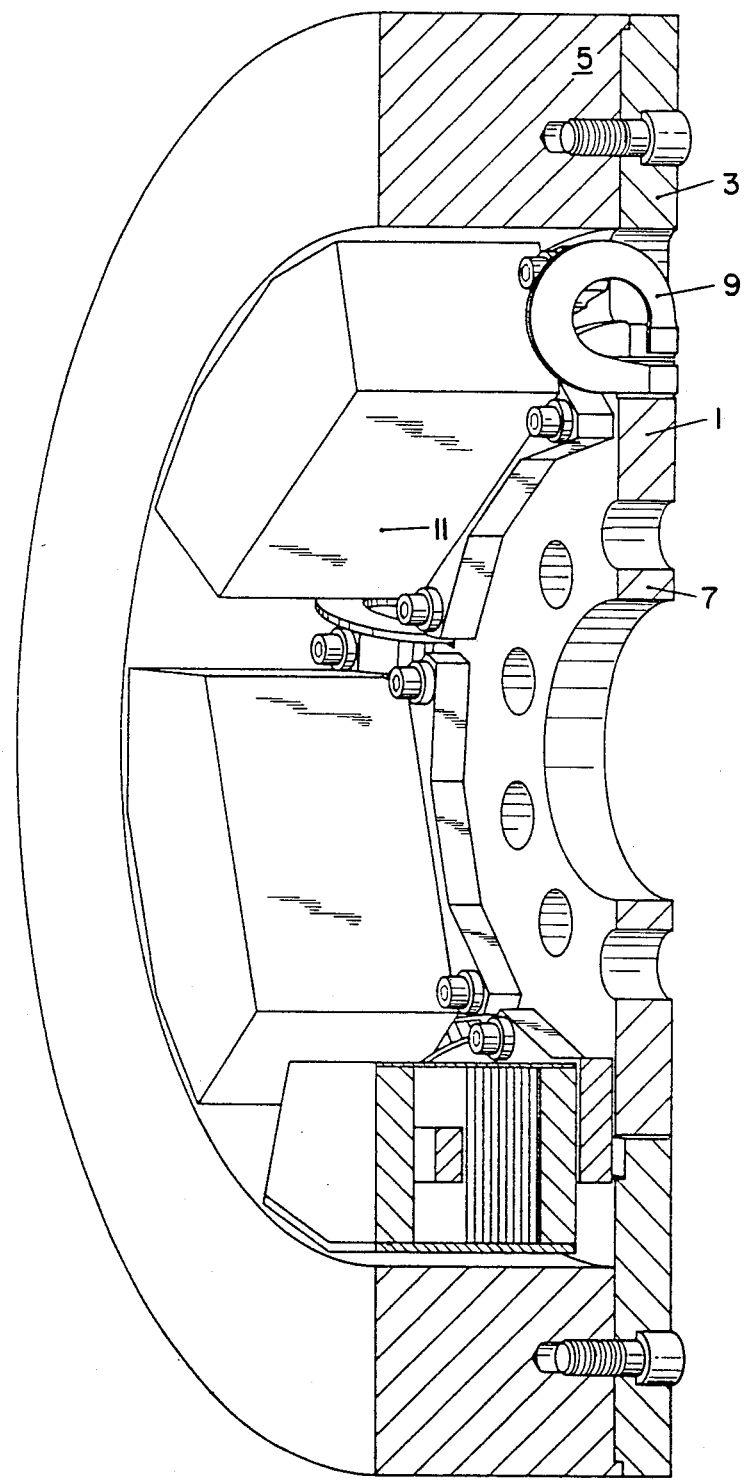
FIG. 1 is an axonometric illustration, partly in section, of the torsional vibration balancer according to the invention.

FIG. 1 is an axonometric view of a torsional vibration balancer, the principal elements of which include a primary member 1, a support disc 3 and a supplemental mass 5 connected to the support disc. Primary member 1 has a radially inward flange 7 by which the primary member is connected to the shaft (not shown) to be damped. The primary member 1 and the support disc 3 are reciprocally guided with the help of springs 9; in the example shown, springs 9 are arcuate and are connected, by means of adjacent clamping blocks, on the one hand to primary member 1, and on the other hand to support disc 3.

Support disc 3 and replaceable supplemental mass 5 comprise the significant portion of the so-called seismic mass of the torsional vibration balancer. Smaller portions derive from damping boxes 11, to be described hereinbelow, in which a resilient, damping coupling of the seismic mass to the primary member 1 is effected. In a vibration balancer of the type described, several damping boxes can be provided, and the component parts of the damping boxes can be variably dimensioned.

Figure 2:
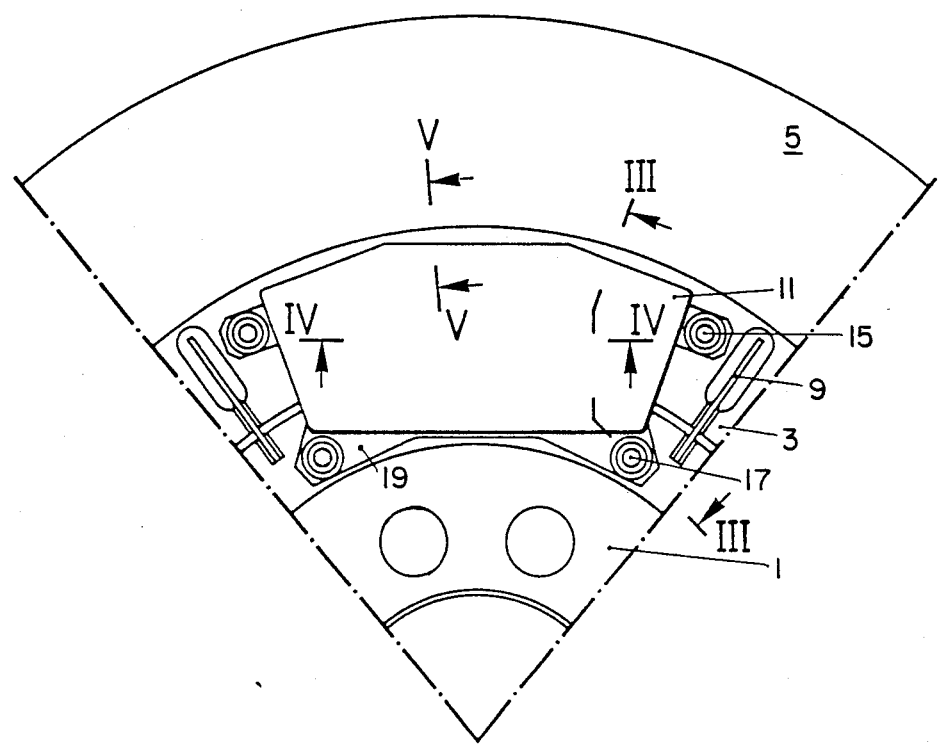
FIG. 2 is a partial plan view of the torsional vibration balancer with one of the damping boxes.
Figure 3:
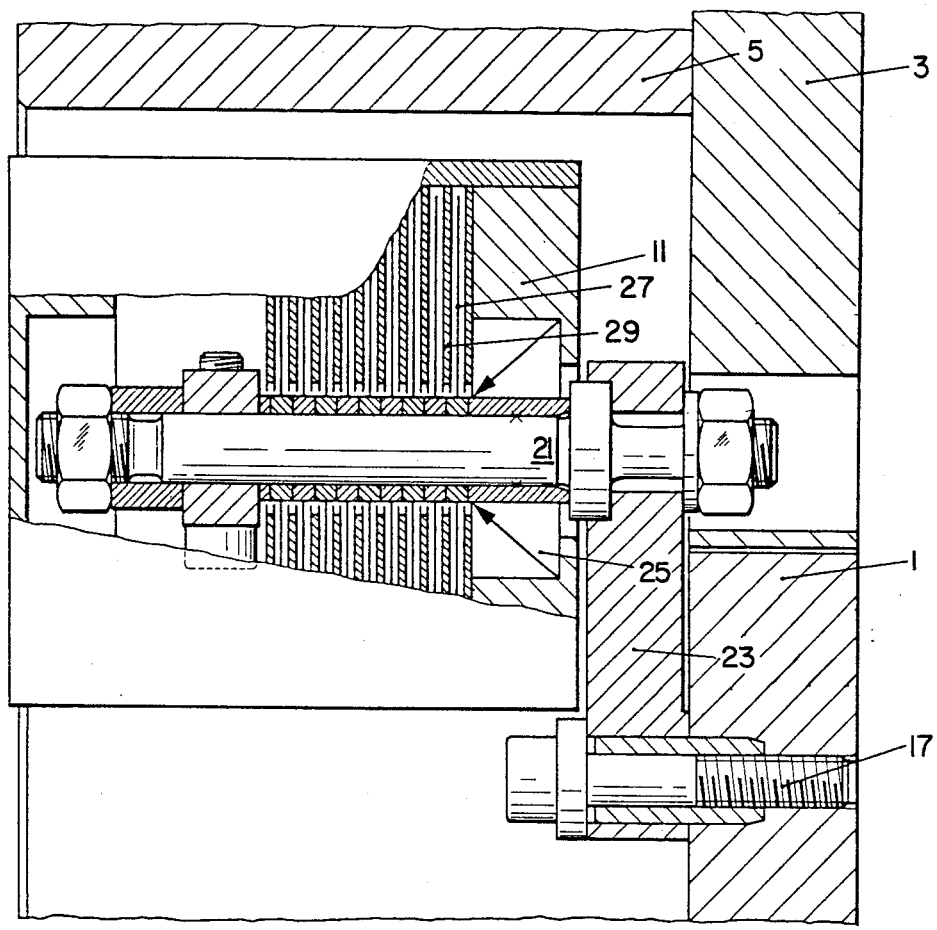
FIGS. 3 to 5 are section views along lines III—III, IV—IV and V—V, respectively, of FIG. 2.

FIG. 2 is a plan view of a closed damping box 5 in its position between two adjacent guide springs 9. The damping box is connected with secondary side support disc 3 by means of a projecting flange 13 and radially outward screws 15, which pass through flange 13, while radially inner screws 17, passing through flange 19, serve to guide the damping box on primary member 1.

In the partly sectioned view in FIG. 1, the manner of guiding the damping box on primary member 1 is shown in more detail. Damping box 11, filled with silicon oil and sealed, is penetrated by fitting bolts 21, which are connected with the supporting body 23 carrying flange 19. Thus, a shearing force of the primary side screw 17 is transmitted in each case to fitting bolts 21 via support body 23. As stated above, fitting bolt 21 extends from the bottom of damping box 11 into the silicon oil filled interior thereof. In this embodiment, the orifice of fitting bolt 21 is hermetically sealed by a seal 25.

In the interior of the damping box, on fitting bolts 21 (two are shown in the illustrated embodiment), several primary side shear sheets 27 are lined up. The number and size of these shear sheets depends on the demands of the device relative to vibration. They may be optimized to produce the greatest damping efficiency. The radially projecting shear sheets 27, connected to the fitting bolts 21, are each arranged between two metal sheets 29 which themselves are fixed within damping box 11 against swinging movement, thus also forming part of the seismic mass of the secondary side. As soon as relative oscillations appear between the secondary side seismic mass and the primary member, the fitting bolt(s) 21 with shear sheets 27 carry out a small amplitude travel vis-a-vis sheets 29 of damping box 11. The silicon oil, which is present between the primary and secondary side sheets, is sheared in accordance with the rhythm of the impressed oscillations, thereby producing the desired resilient and damping coupling.

Figure 4:
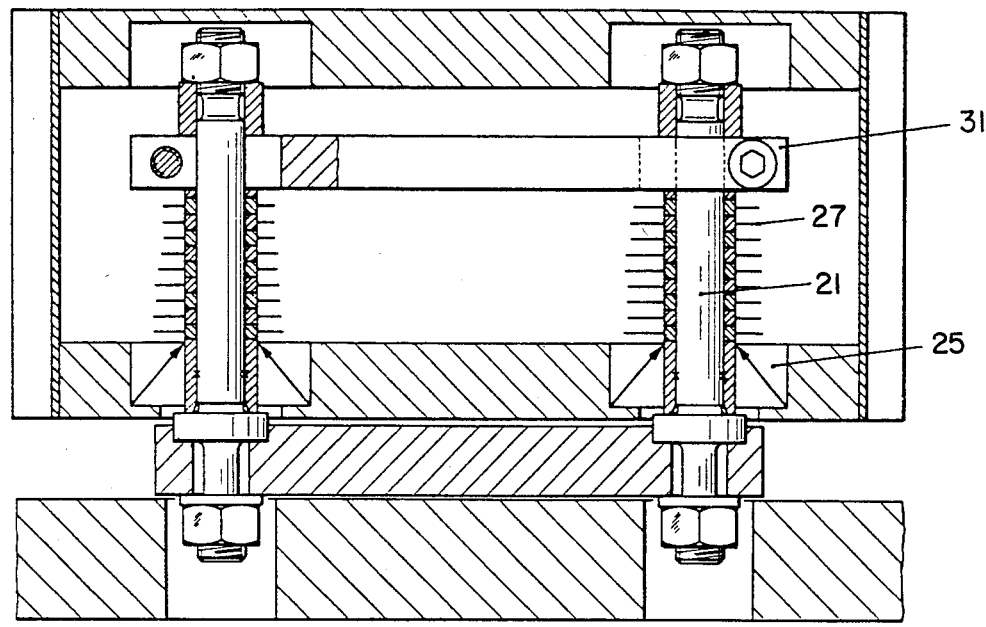

Between the primary member 1, e.g., connected to the fitting bolt, and the secondary member of the vibration balancer, considerable variable forces must be transmitted, to be resisted by fitting bolts 21. The section view of FIG. 4 shows how, for the purpose of improving the alternating bending resistance, two fitting bolts 21 are assembled by means of a tie rod 31 into a bending resistant frame. The attachment of tie rod 31 on the fitting bolts is so selected that it can transmit bending moments.

Figure 5:
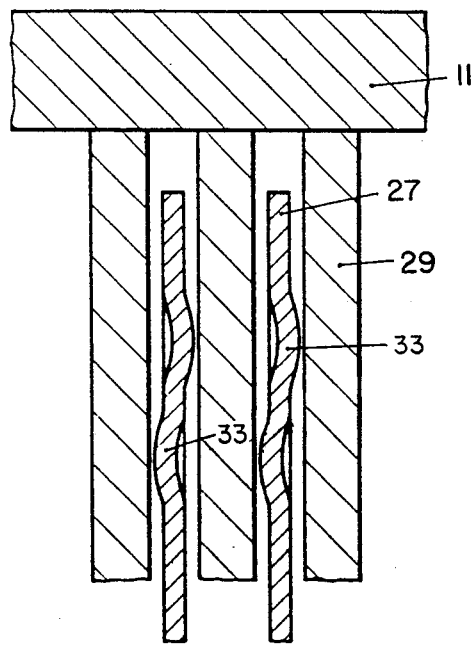

FIG. 5 of the drawing shows, in greatly enlarged scale, two primary side shear sheets 27 as well as three secondary side sheets 29 (representing the totality of the shear sheet assembly). Shear sheets 27 are made especially thin, so that the primary mass is minimal. The stiffening elements 33 of limited length, impressed on both sides of shear sheets 27, guide the thin shear sheets between the thicker secondary side sheets 29. In each case, the working slots filled with silicon oil, are located between the primary and secondary side shear sheets.

What is claimed is:

1. Torsional vibration balancer with a viscous damping medium, having an annular seismic mass extending radially beyond a primary member and being guided for smooth rotating movement by a plurality of spring means located opposite said primary member, damping boxes for resilient, damped coupling of said seismic mass being arranged between said primary member and said seismic mass, wherein said damping boxes are attached to a secondary side structural member, said damping boxes having shear sheets extending therein which are connected via at least one intermediate member with said primary member, said damping boxes further having metal sheets extending therein and connected thereto, said metal sheets extending in spaced relation between said shear sheets, the spaces between said metal sheets and said shear sheets being filled with silicon oil.

2. Torsional vibration balancer according to claim 1, wherein said at least one intermediate member comprises a fitted bolt extending from a supporting body connected with said damping box, and said shear sheets are parallel to one another and extend in planes perpendicular to the rotational axis of said fitted bolt.

3. Torsional vibration balancer according to claim 2, wherein the openings for said fitted bolts into said damping boxes are sealed by means of a vulcanized, radially resilient, silicon oil containing elastomer seal.

4. Torsional vibration balancer according to claim 2 or 3, wherein the fitted bolts for mounting said primary side shear sheets are connected to a statically redundant frame member for the purpose of reducing alternating bending demands.

5. Torsional vibration balancer according to claim 1 or 2, wherein stiffening elements of limited length are impressed on both top surfaces of said primary side shear sheets.

6. Torsional vibration balancer according to any one of claims 1, 2 or 3, wherein said damping boxes are attached on their secondary sides to a support disc carrying a replaceable supplemental mass.

* * * * *